United States Patent [19]

Takizawa

[11] Patent Number: 5,703,982
[45] Date of Patent: Dec. 30, 1997

[54] RECEPTACLE-TYPE LIGHT MODULE AND LIGHT CONNECTOR COUPLING APPARATUS

[75] Inventor: Teruo Takizawa, Tokyo, Japan

[73] Assignee: NEC Corporation, Japan

[21] Appl. No.: 690,154

[22] Filed: Jul. 19, 1996

[30] Foreign Application Priority Data

Jul. 21, 1995 [JP] Japan .................. 7-207652

[51] Int. Cl.⁶ .................................................. G02B 6/36
[52] U.S. Cl. ................................ 385/78; 385/60; 385/72
[58] Field of Search .......................... 385/78, 72, 60, 385/65, 66, 83, 84

[56] References Cited

U.S. PATENT DOCUMENTS 4,361,380  11/1982  Marazzi ........................ 350/96.21
4,636,034  1/1987   Kashimura et al. ............... 385/72

FOREIGN PATENT DOCUMENTS 56-74213  6/1981  Japan ............................ G02B 7/26
63-86606  6/1988  Japan ............................ G02B 6/32

Primary Examiner—Phan T. H. Palmer
Attorney, Agent, or Firm—Hayes, Soloway, Hennessey, Grossman & Hage, P.C.

[57] ABSTRACT

In a receptacle-type module, a sleeve for receiving and holding a ferrule of a light connector has a plurality of grooves which are formed on an inner wall surface of the sleeve so as to be parallel to the ferrule insertion direction or spiral and have a crossing angle of not greater 45 degrees relative to the ferrule insertion direction. With this feature, it is possible to prevent accumulation of foreign matter or dust, with the result that the amount of variation of optical characteristics is minimized. Thus, the receptacle-type module can have high reproducibility and high reliability.

15 Claims, 8 Drawing Sheets

RECEPTACLE-TYPE LIGHT MODULE AND LIGHT CONNECTOR COUPLING APPARATUS

BACKGROUND OF THE INVENTION

1. Field of the Invention

The present invention relates to a receptacle-type light emitting/receiving module and a light connector coupling apparatus, which are used in the field of optical communication and opto-electronic measurement.

2. Description of Related Art

At present, in the field of optical communication and opto-electronic measurement, miniaturization and simplification of apparatuses are advanced, and therefore, for miniaturization and simplification of the overall apparatus, miniaturization and simplification of light emitting/recycling modules is also required.

Of the light emitting/receiving modules, a so called receptacle-type module having no associated optical fiber, is most suitable for miniaturization of apparatus, and therefore, market demand for a low cost receptacle-type module of high performance and high reliability is increasing.

Now, prior art examples of the receptacle-type module will be described with reference to FIGS. 1A, 1B, 2, 3A and 3B.

FIGS. 1A and 1B are a diagrammatic sectional view and a plan view of a receptacle part of a conventional receptacle-type module, respectively, which will be called a "first prior art example" hereinafter. In particular, FIG. 1A shows a condition in which a tip end of a ferrule 9 of a light connector is barely inserted into a receptacle 1.

As shown in FIG. 1A, the receptacle 1 includes a sleeve 3 for receiving and holding the ferrule 9 of the light connector and having the function of aligning the ferrule 9 with an optical axis 2 of the receptacle-type module, a threaded collar 4 coaxially surrounding the sleeve 3 and having an outer thread for being mated with a housing (not shown) of the light connector, and a flange 5 integral with a base end of each of the sleeve 3 and the threaded collar 4 and for being used to fix the receptacle 1 to an external apparatus.

In general, in order to perform fine optical axis adjustment on the order of a few micrometers to a few tens micrometers in the process of assembling the light emitting/receiving module, machining precision of tolerance of a few micrometers is required for an inner diameter of the sleeve 3 of the receptacle 1, and machining precision or tolerance of a few tens micrometers is required for an optical reference plane 7 of the receptacle 1. Depending upon the level of these machining precisions, reproducibility and reliability of the optical characteristics of the receptacle-type module is determined.

In the general receptacle-type module of the prior art shown in FIGS. 1A and 1B, foreign matter adhering to the ferrule 9 and existing between the ferrule 9 and the sleeve 3, deposit on an inner surface of the sleeve 3 and on the optical reference plane 7. The deposited foreign matter and dust make alignment of the ferrule 9 inaccurate, with the result that the reproducibility and reliability of optical characteristics of the receptacle-type module are deteriorated.

Under these circumstances, in order to prevent the foreign matter from being inserted into the inside of the receptacle 1 and to avoid deposition of the dust in the inside of the receptacle, for example, Japanese Utility Model Application Laid-open Publication JP-U-63-86606 and Japanese Patent Application Laid-open Publication JP-A-56-74213 and its corresponding U.S. Pat. No. 4,361,380 have proposed forming a groove in an inner wall surface of the sleeve. The disclosures of these patent publications are incorporated by reference in their entireties into this application.

Referring to FIG. 2, there is shown a diagrammatic sectional view of the structure of the receptacle disclosed in JP-U-63-86606, which will be called a "second prior art example" hereinafter. In FIG. 2, elements similar to those shown in FIG. 1A are given the same reference numerals and explanation thereof will be omitted for simplification of description.

As shown in FIG. 2, the second prior art example includes a single spiral groove 19 formed in an inner wall surface of the sleeve 3 which has many turns.

In the second prior art example shown in FIG. 2, however, until the ferrule 9 has been completely inserted and fitted into the sleeve 3, the tip end surface of the ferrule 9 collides with an edge of the groove 19 many times, since the spiral groove 19 has many turns. As a result, dust is generated in an amount exceeding the amount which can be excluded by the groove 19.

Referring to FIG. 3A, there is shown a diagrammatic sectional view of the structure of the receptacle disclosed in JP-A-56-74213, which will be called a "third prior art example" hereinafter. In FIG. 3A, elements similar to those shown in FIGS. 1A and 2 are given the same reference numerals and explanation thereof will be omitted for simplification of description.

As shown in FIG. 3A, the third prior art example includes spiral groove 19 having many turns formed in an inner wall surface of the sleeve 3, and a plurality of wide annular grooves 20 formed in the an inner wall surface of the sleeve 3, which are separated from each other in an axial direction, and are superposed upon the spiral groove 19. The spiral groove 19 and the annular grooves 20 are very effective as a vent passage for expelling air when the ferrule is inserted into the sleeve 3.

However, even in the third prior art example shown in FIG. 3A, the tip end surface of the ferrule 9 collides with an edge of the groove 19 and the annular grooves 20 many times until the ferrule 9 has been completely inserted and fitted into the sleeve 3. Therefore, the amount of dust generated is large and is similar to the amount generated in the second prior art example.

Furthermore, in the third prior art example, as shown in FIG. 3B, which is an enlarged partial sectional view showing the groove 19 and its periphery, the width 11 and depth 12 of the groove 19 are 0.4 mm and 0.2 mm, respectively. On the other hand, a cut length 21 of a chamfered or deburred surface 10 of the tip end of the ferrule 9 is ordinarily on the order to 0.2 mm and 0.3 mm. Accordingly, from the view point of construction, the tip end of the ferrule 9 easily collides with the groove 19 and 20. In other words, the size of the groove is not optimized. This is one of the causes of dust generation.

As mentioned above, the first prior art example of the receptacle-type module is disadvantageous in that, foreign matter adhering to the ferrule and dust between the ferrule and the sleeve, deposit on the inner surface of the sleeve and on the optical reference plane, so as to ultimately make alignment of the ferrule inaccurate, with the result that reproducibility and reliability of the optical characteristics of the receptacle-type module are deteriorated.

On the other hand, the second and third prior art examples of the receptacle-type module having the spiral and/or annular grooves formed in the inner surface of the sleeve, are disadvantageous in another way in that there occurs dust of an amount exceeding the dust excluding capabilities of these techniques.

SUMMARY OF THE INVENTION

Accordingly, it is an object of the present invention to provide a receptacle-type light emitting/receiving module and a light connector coupling apparatus, which overcome the above-mentioned defects of the prior art examples.

Another other of the present invention is to provide a receptacle-type light emitting/receiving module and a light connector coupling apparatus, having a groove, which is formed in an inner surface of the sleeve, for excluding foreign matter and dust, but which does not deteriorate and reproducibility and the reliability of the optical characteristics of the receptacle-type module.

The above and other objects of the present invention are achieved in accordance with the present invention by a receptacle for connection of a light connector, the receptacle having a sleeve for receiving and holding a ferrule of the light connector and an optical reference plane provided at a bottom position of the sleeve and for abutting against a tip end of the ferrule when the ferrule is completely inserted into the sleeve, the sleeve comprising a plurality of grooves formed on an inner wall surface of the sleeve and extending from a ferrule insertion end of the sleeve towards the optical reference plane.

In one embodiment, the grooves are parallel to a ferrule insertion direction. Preferably, the grooves extend to an end of the sleeve continuous with the optical reference plane, and the optical reference plane has grooves formed thereon in communication with the grooves formed on the inner wall surface of the sleeve.

More preferably, the width and the depth of each of the grooves are about 30% to 40% of the cut length of the chamfered surface of the tip end of the ferrule.

In another embodiment, the grooves are spiral and have a crossing angle of not greater than a predetermined angle relative to a ferrule insertion direction. For example, the predetermined angle may be 45 degrees.

According to another aspect of the present invention, there is provided a receptacle for connection of a light connector, the receptacle having a sleeve for receiving and holding a ferrule of the light connector and an optical reference plane provided at a bottom position of the sleeve and for abutting against a tip end of the ferrule when the ferrule is completely inserted into the sleeve, the sleeve comprising at least one groove formed on an inner wall surface of the sleeve and extending from a ferrule insertion end of the sleeve towards the optical reference plane, an angle formed between the at least one groove and a ferrule insertion direction being not greater than 45 degrees.

Preferably, the width and depth of the at least one groove are about 30% to 40% of the cut length of the chamfered surface of the tip end of the ferrule. In addition, the at least one groove extends to an end of the sleeve continuous with the optical reference plane, and the optical reference plane has at least one groove formed thereon in communication with the at least one groove formed on the inner wall surface of the sleeve. Furthermore, in one embodiment, the above-mentioned angle is zero so that the at least one groove is parallel to the ferrule insertion direction.

According to still another aspect of the present invention, there is provided a light connector coupling apparatus for aligning an optical axis of a ferrule of two light connectors with each other, by means of one sleeve, which receives the ferrule of each of the two light connectors from opposite ends of the sleeve so that a tip end of the ferrule of each of the two light connectors is abutted against each other within the sleeve, the sleeve having at least one notch extending substantially in a ferrule insertion direction from each of the opposite ends of the sleeve so as to exceed a center position of the sleeve.

Preferably, an angle formed between the at least one notch and the ferrule insertion direction is not greater than 45 degrees. In one specific embodiment, this angle is zero so that the at least one notch is parallel to the ferrule insertion direction.

The above and other objects, features and advantages of the present invention will be apparent from the following description of preferred embodiments of the invention with reference to the accompanying drawings.

DESCRIPTION OF THE PREFERRED EMBODIMENTS

Figure 1A:
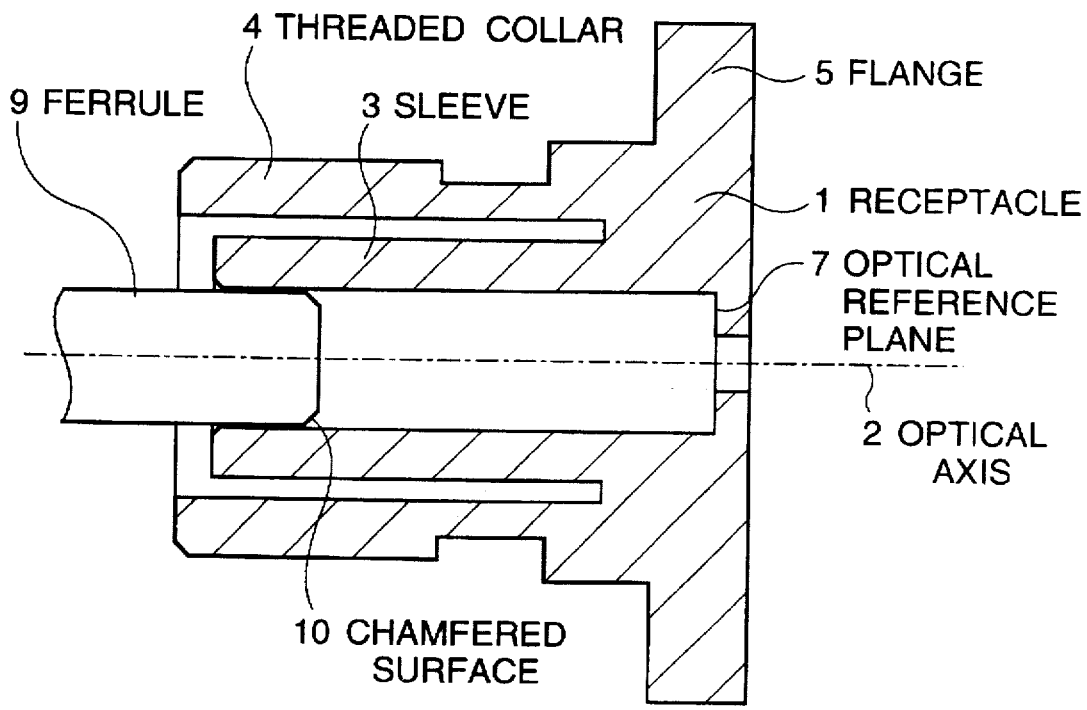
FIG. 1A is a diagrammatic sectional view of the "first prior art example" of the receptacle-type module.
Figure 1B:
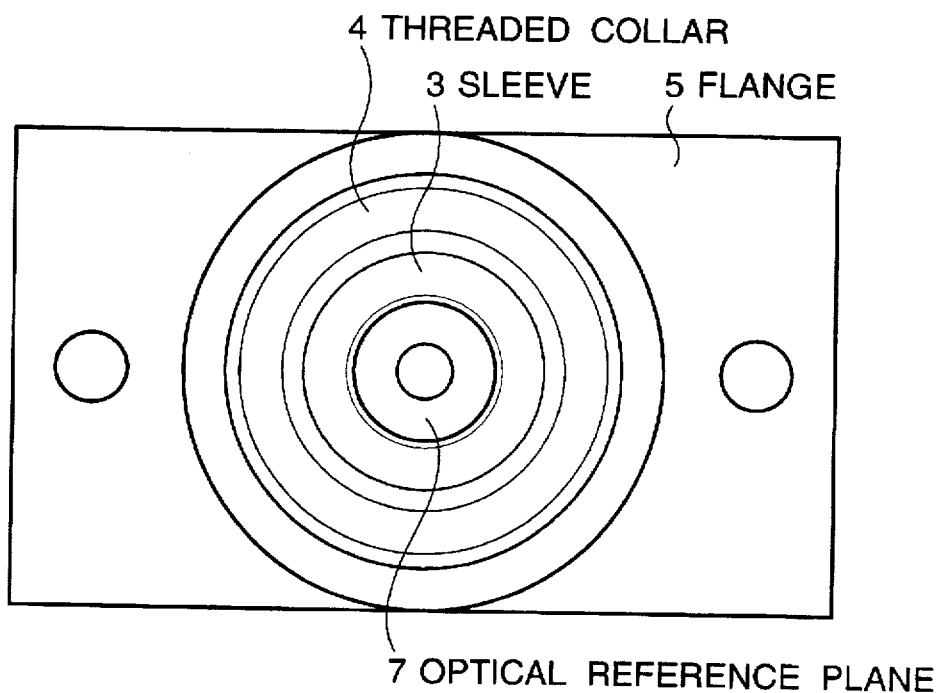
FIG. 1B is a plan view of the receptacle-type module shown in FIG. 1A.
Figure 2:
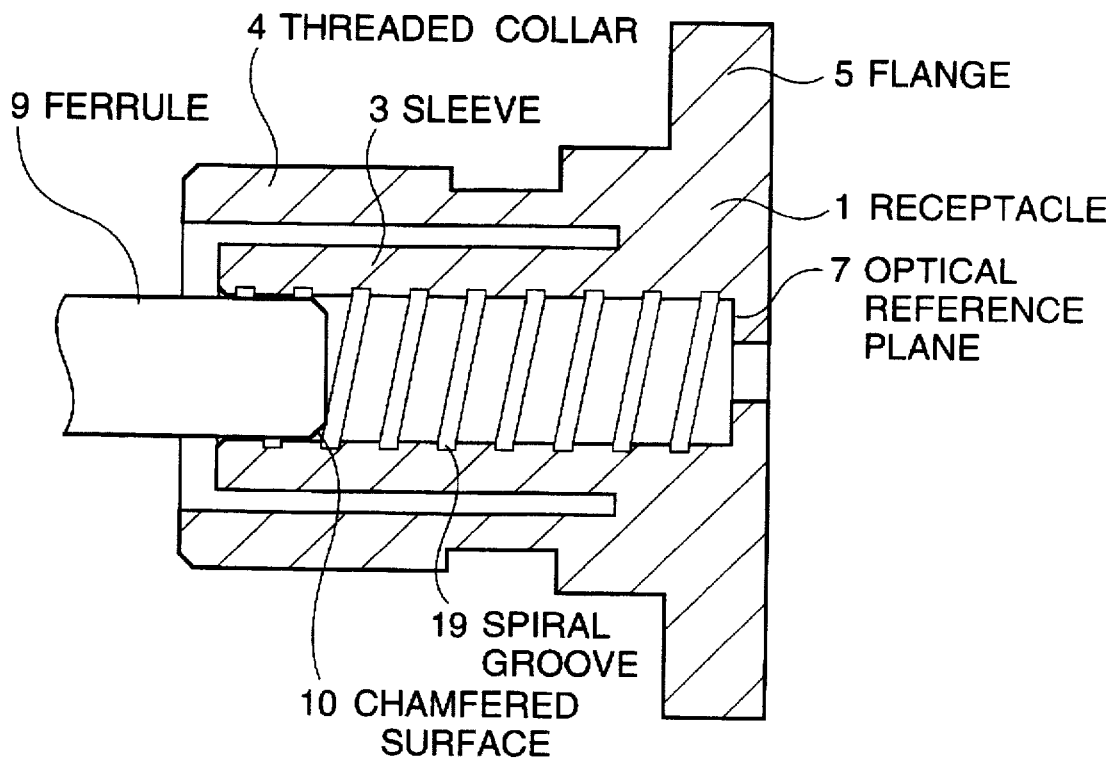
FIG. 2 is a view similar to FIG. 1A but showing the "second prior art example"
Figure 3A:
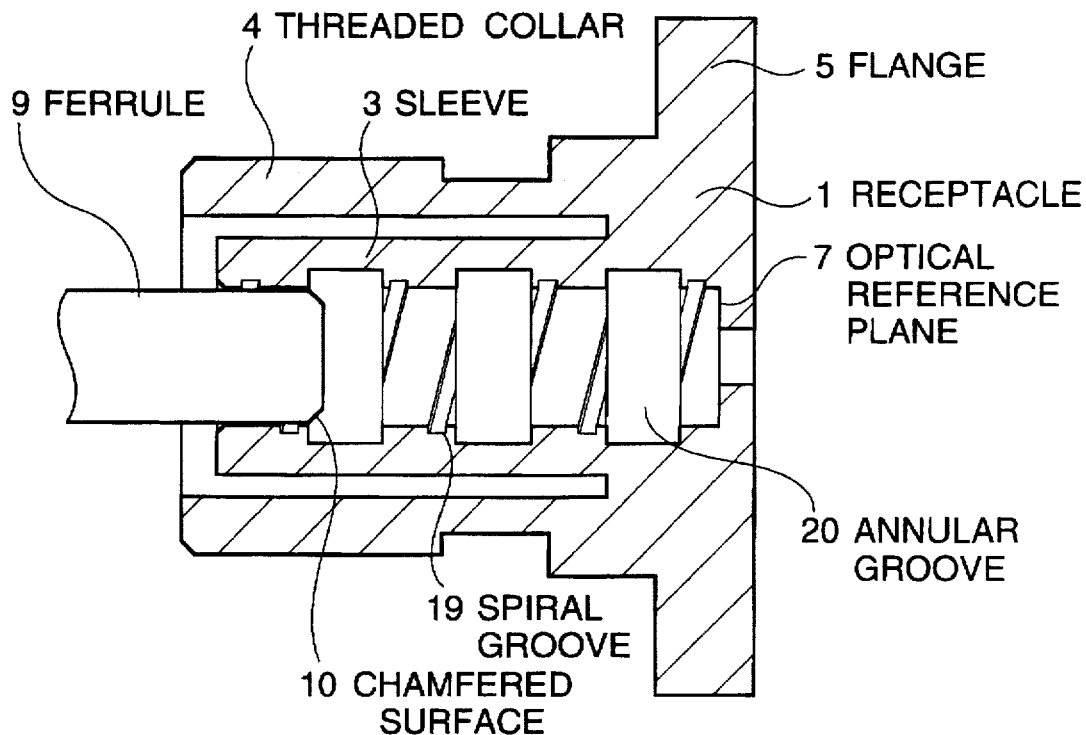
FIG. 3A is a view similar to FIG. 1A but showing the "third prior art example"
Figure 3B:
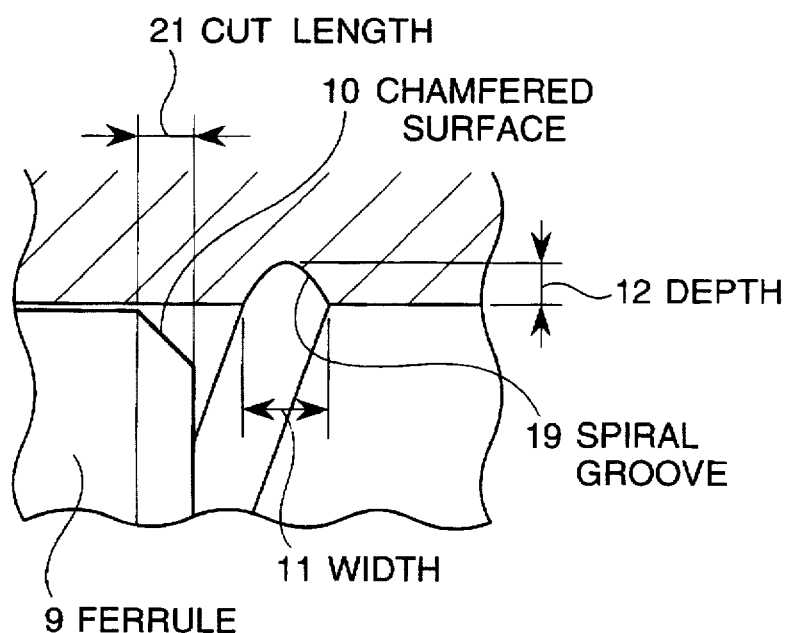
FIG. 3B is an enlarged partial sectional view showing the groove and its periphery of the receptacle-type module shown of FIG. 3A.
Figure 4:
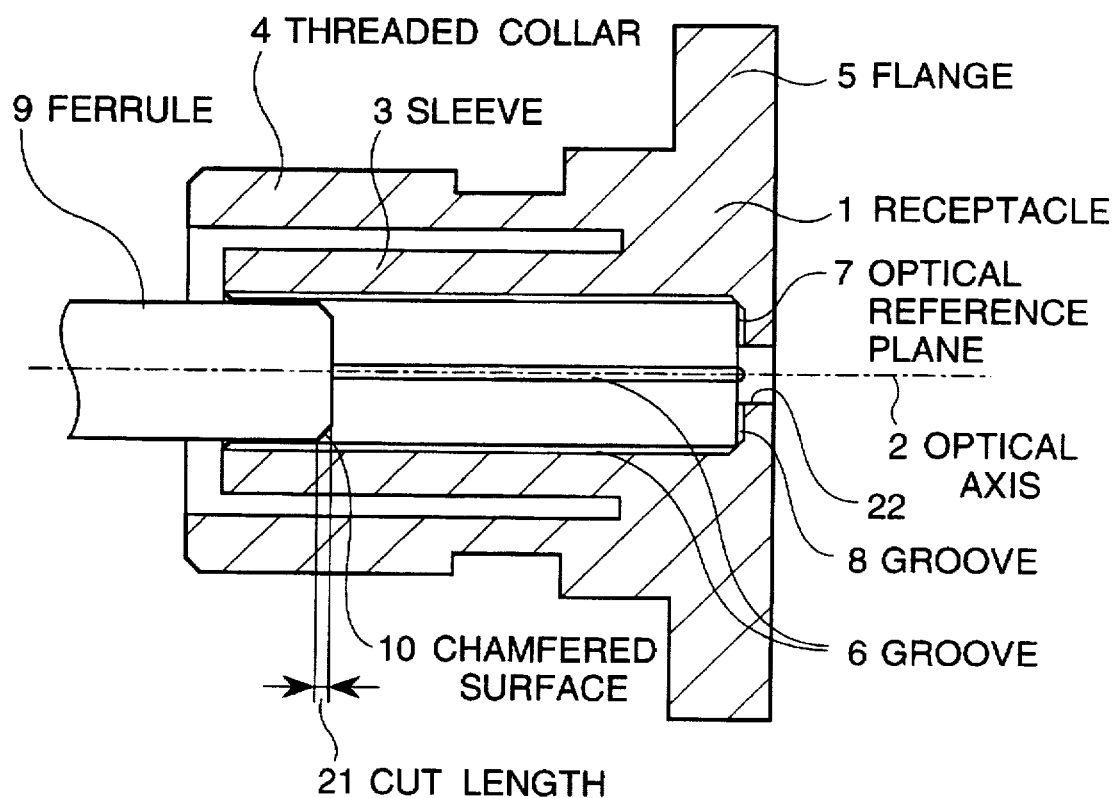
FIG. 4 is a diagrammatic sectional view of a first embodiment of the receptacle-type module in accordance with the present invention.
Figure 5A:
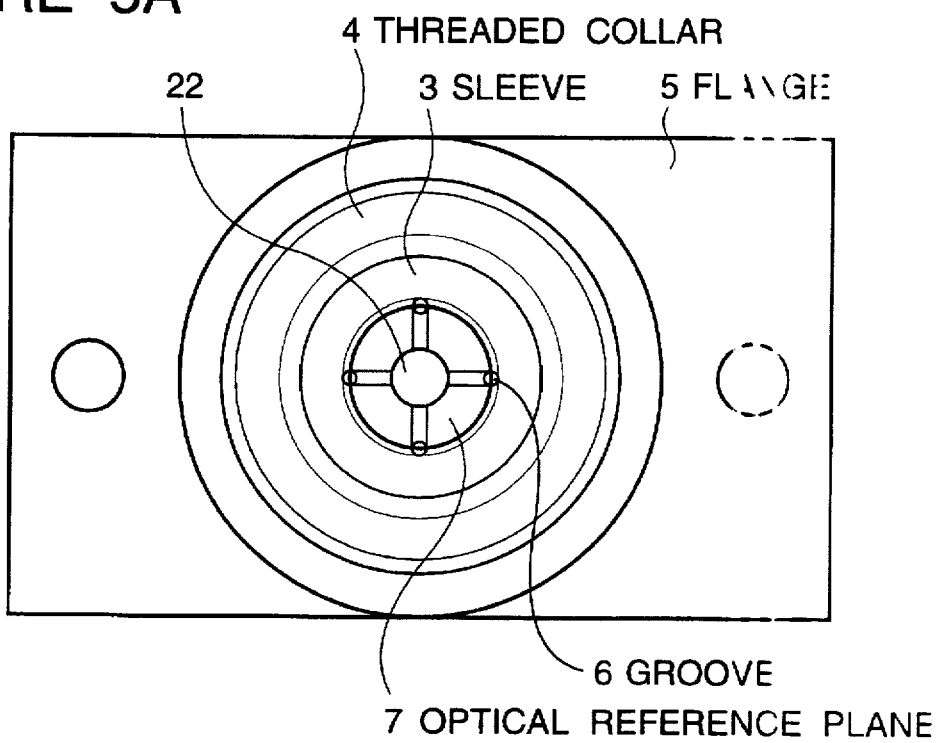
FIG. 5A is a plan view of the receptacle-type module shown in FIG. 4.
Figure 5B:
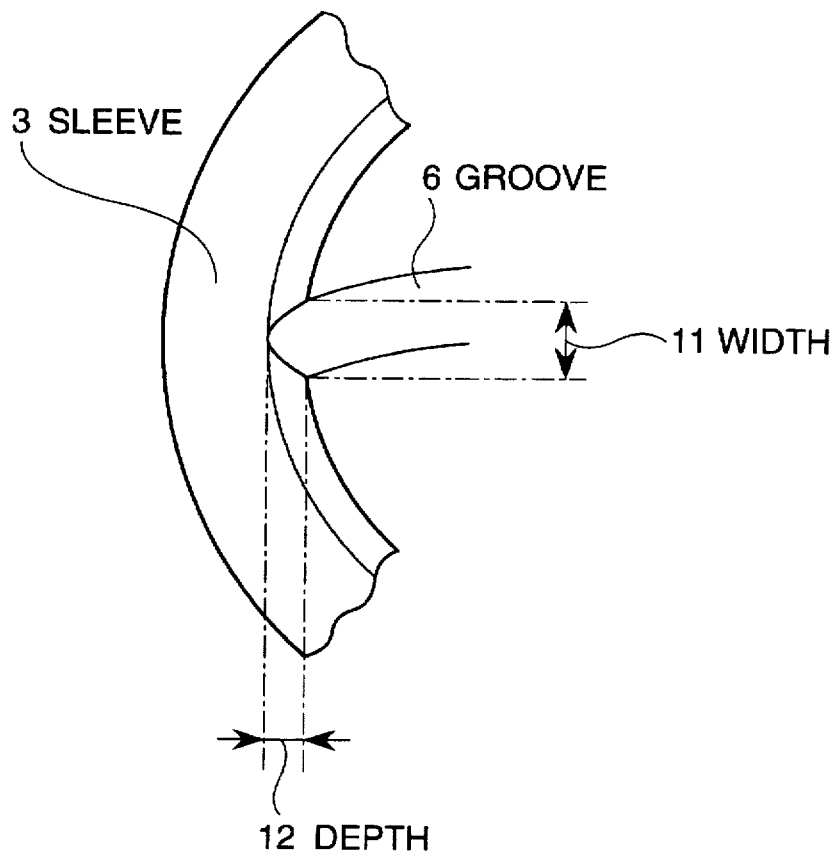
FIG. 5B is an enlarged partial sectional view showing the groove provided in the receptacle-type module shown in FIG. 4.

Referring to FIG. 4, there is shown a diagrammatic sectional view of a first embodiment of the receptacle-type module in accordance with the present invention. FIG. 5A is a plan view of the receptacle-type module shown in FIG. 4, and FIG. 5B is an enlarged partial sectional view showing the groove provided in the receptacle-type module shown in FIG. 4. In these drawings, elements similar to those shown in FIGS. 1A, 1B, 2, 3A and 3B are given the same reference numerals.

As seen from FIGS. 4 and 5A, the shown receptacle 1 has an integral structure and includes a sleeve 3 for receiving and holding a ferrule 9 of a light connector (not shown) and having a function of aligning the ferrule 9 with an optical axis 2 of the receptacle-type module, a threaded collar 4 coaxially surrounding the sleeve 3 and having an outer thread for being mated with a housing (not shown) of the light connector, and a flange 5 integral with a base end of each of the sleeve 3 and the threaded collar 4 and used for fixing the receptacle 1 to an external apparatus. The flange 5 has a center through-hole 22 in alignment with the optical axis 2 of the receptacle-type module.

In an inner wall surface of the sleeve 3, one or more grooves 6 are formed so as to straightly extend in an insertion direction of the ferrule 9, namely, in parallel to the optical axis 2 of the receptacle-type module. In the shown example, as seen from FIG. 5A, four grooves 6 are formed with equal angular intervals. These grooves 6 extend from an output end (namely, a ferrule insertion end) of the sleeve 4 to an opposite end (namely, an end continuous with an optical reference plane 7, which is formed at a bottom of an inner space of the sleeve 3). On optical reference plane 7, second grooves 8 are formed in communication with the grooves 6 and crossing each other, as shown in FIG. 5A.

The width 11 and the depth 12 of each of the grooves 6 and 8 as shown in FIG. 5B are preferred to be about 30% to 40% of the cut length 21 of the chamfered or deburred surface 10 of the tip end of the ferrule 9 shown in FIG. 4. For example, when the cut length 21 of the ferrule to be inserted into the sleeve is 0.3 mm, the width 11 and the depth 12 of the grooves are made about 0.1 mm.

In the above-mentioned receptacle-type module, foreign matter and dust, which scratch the inner wall surface of the sleeve 3 and the end surface and the side surface of the ferrule 9, are caused to temporarily go into the grooves 6 and 8, and then, are expelled or excluded to an exterior of the ferrule 9 by action of air pressure generated when the light connector is inserted. After the ferrule 9 has been substantially inserted into the sleeve 3, if the foreign matter and dust remain on the tip end surface and the chamfered surface 10 of the ferrule 9, the remaining foreign matter and dust are entrapped into the grooves 8 by rotating the ferrule 9, with the result that the ferrule 9 is completely inserted into the sleeve 3 with the tip end surface of the ferrule 9 contacting the optical reference plane 7.

On the other hand, since width 11 and depth 12 of the grooves 6 are about 30% to 40% of the cut length 21 of the chamfered or deburred surface 10 of the tip end of the ferrule 9, it is possible to minimize generation of dust caused by collision between the edge of the grooves 6 and the end surface of the ferrule 9.

In this embodiment, because of provision of grooves 6 and 8, even after insertion and extraction of the light connector were carried out several hundred times, centering or alignment could be precisely carried out, with the result that amount of variation in the optical characteristics of the receptacle-type module could be reduced to not greater than 3%. Accordingly, it is possible to provide a receptacle-type module having high reproducibility and high reliability.

Figure 6A:
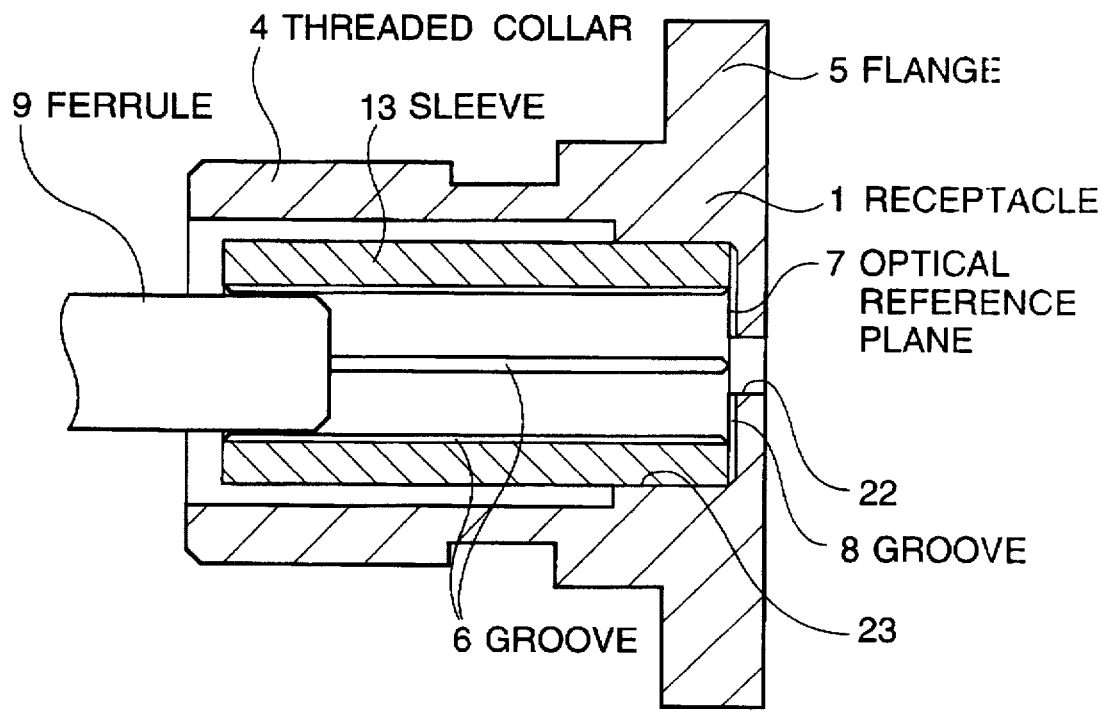
FIG. 6A is a view similar to FIG. 4 but showing a second embodiment of the receptacle-type module in accordance with the present invention.
Figure 6B:
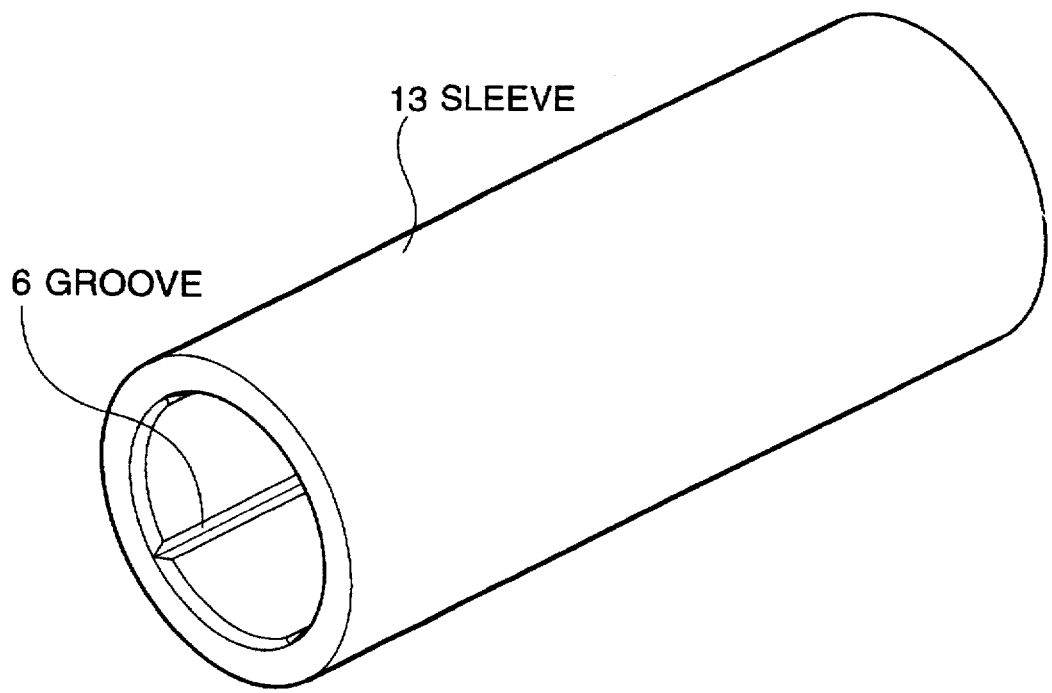
FIG. 6B is a diagrammatic perspective view of the discrete sleeve part of the receptacle-type module shown in FIG. 6A.

Referring to FIG. 6A, there is shown a diagrammatic sectional view of a second embodiment of the receptacle-type module in accordance with the present invention. FIG. 6B is a diagrammatic perspective view of the discrete sleeve part of the receptacle-type module shown in FIG. 6A. In these drawings, elements similar to those shown in FIGS. 4, 5A, and 5B are given the same reference numerals, and explanation thereof will be omitted for simplification of description.

As seen from comparison between FIGS. 4 and 5A and 6A and 6B, the second embodiment is different from the first embodiment only in that sleeve 13 for receiving the ferrule 9 is formed discretely from the flange 5 integral with the threaded collar 4, and forcedly fitted and fixed into a circular recess 23 formed at a center region of the flange 5. A bottom of the circular recess 23 constitutes the optical reference plane 7, on which the grooves 8 are formed in similar fashion to the first embodiment. The discrete sleeve 13 has grooves 6 formed on an inner wall surface thereof, in similar fashion to the first embodiment. The discrete sleeve 13 is formed of, for example, a sintered material such as zirconia.

In this second embodiment, grooves 6 of sleeves 13 are formed by using a mold, not by machining or cutting. Therefore, at a periphery of grooves 6 of sleeve 13, there is no fine burr which would be inevitably formed in the machining or cutting process. Therefore, generation of dust can be more effectively prevented, so that it is possible to more precisely center or align the inserted ferrule 9. Accordingly, this second embodiment can provide a receptacle-type module having high reproducibility and high reliability, similar to the first embodiment.

Figure 7A:
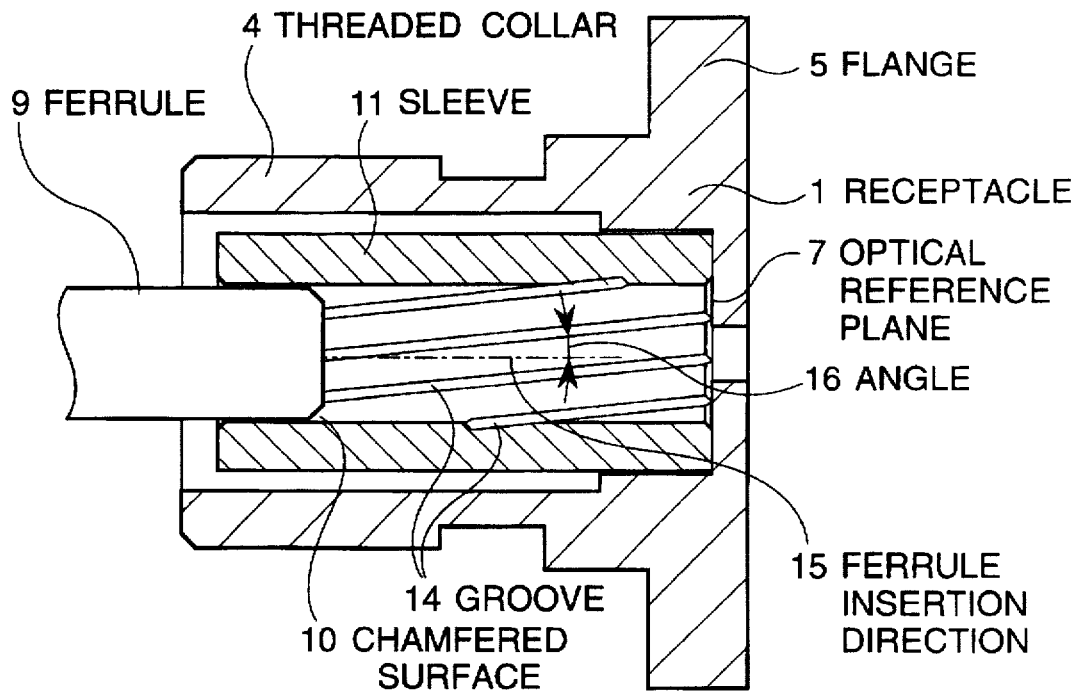
FIG. 7A is a view similar to FIG. 4 but showing a third embodiment of the receptacle-type module in accordance with the present invention.
Figure 7B:
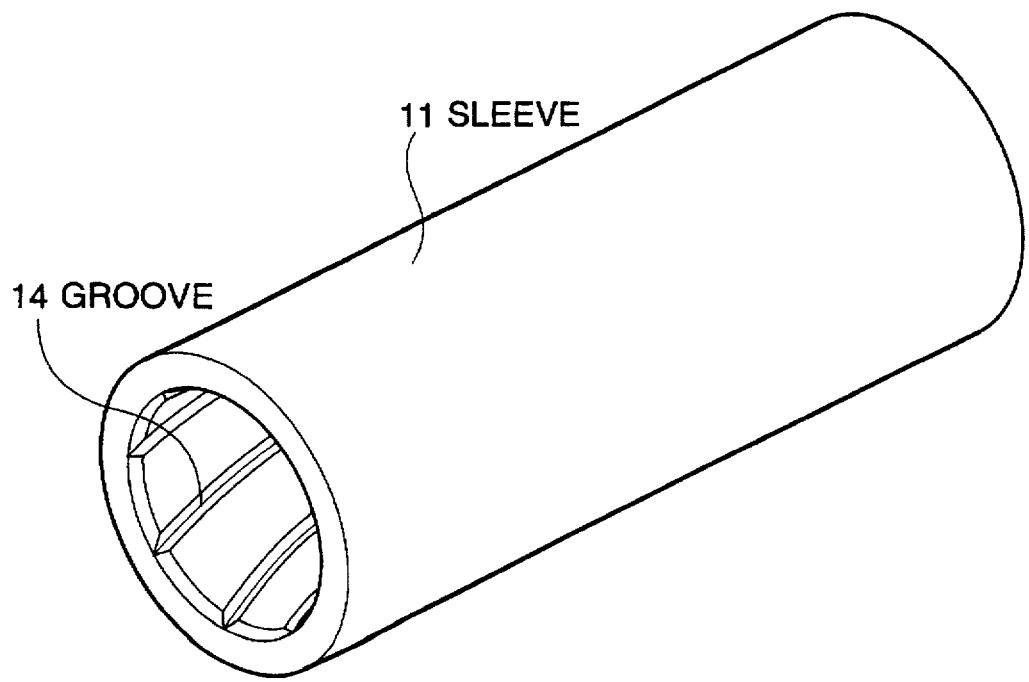
FIG. 7B is a diagrammatic perspective view of the discrete sleeve part of the receptacle-type module shown in FIG. 7A.

Referring to FIGS. 7A, there is shown a diagrammatic sectional view of a third embodiment of the receptacle-type module in accordance with the present invention. FIG. 7B is a diagrammatic perspective view of the discrete sleeve part of the receptacle-type module shown in FIG. 7A. In these drawings, elements similar to those shown in FIGS. 4, 5A, 5B, 6A and 6B are given the same reference numerals, and explanation thereof will be omitted for simplification of description.

This third embodiment is a modification of the second embodiment. As seen from comparison between FIGS. 6A and 7A, the third embodiment includes, in place of sleeve 13 in the second embodiment, a sleeve 11 having a plurality of spiral grooves 14, which are formed on an inner wall surface of the sleeve 11 and which extend with a crossing angle 16 to a sleeve insertion direction straight line 15 on the inner wall surface of the sleeve 11 parallel to the center optical axis 2 of the receptacle-type module shown in FIG. 4. This angle 16 is not greater than 45 degrees. In the shown embodiment, six spiral grooves 13 are formed.

In this third embodiment, since the angle between the groove 14 and the sleeve insertion direction straight line 15 is not greater than 45 degrees, the number of times of collision between the grooves 14 and the tip end of the ferrule 9 can be kept small, and therefore, it is possible to avoid generation of dust in an amount exceeding the dust excluding capability of the grooves.

On the other hand, since grooves 14 are slightly spiral-shaped, contact area between the grooves 14 and the side surface of the ferrule 9 can be increased, compared with the first and second embodiments. Namely, in the first and second embodiments, the grooves 6 are straight parallel to the optical axis 2 and therefore if the ferrule 9 is inserted to the sleeve 3 or 13 with no relative rotation between the ferrule 9 and the sleeve 3 or 13, an area of the side surface of the ferrule 9 in positional match with each of grooves 6 does not contact with the inner surface of the sleeve. On the other hand, in the third embodiment, even if the ferrule 9 is inserted to the sleeve 11 with no relative rotation between the ferrule 9 and the sleeve 11, all of the side surface of the ferrule 9 contacts the inner surface of the sleeve until the ferrule 9 is completely inserted into the sleeve 11, since the grooves 14 are slightly spiral-shaped. Therefore, it is possible to more effectively exclude foreign matter and dust. In this regard, assuming that the number of the grooves 14 is "n", each of the grooves 14 is preferred to rotate or revolve by about 1/n of one turn (namely, 360°/n), and preferably slightly more than 1/n of one turn, from the ferrule insertion end to the base end of the sleeve 11.

Thus, the third embodiment can provide a receptacle-type module having high reproducibility and high reliability, similar to the first and second embodiments.

Figure 8A:
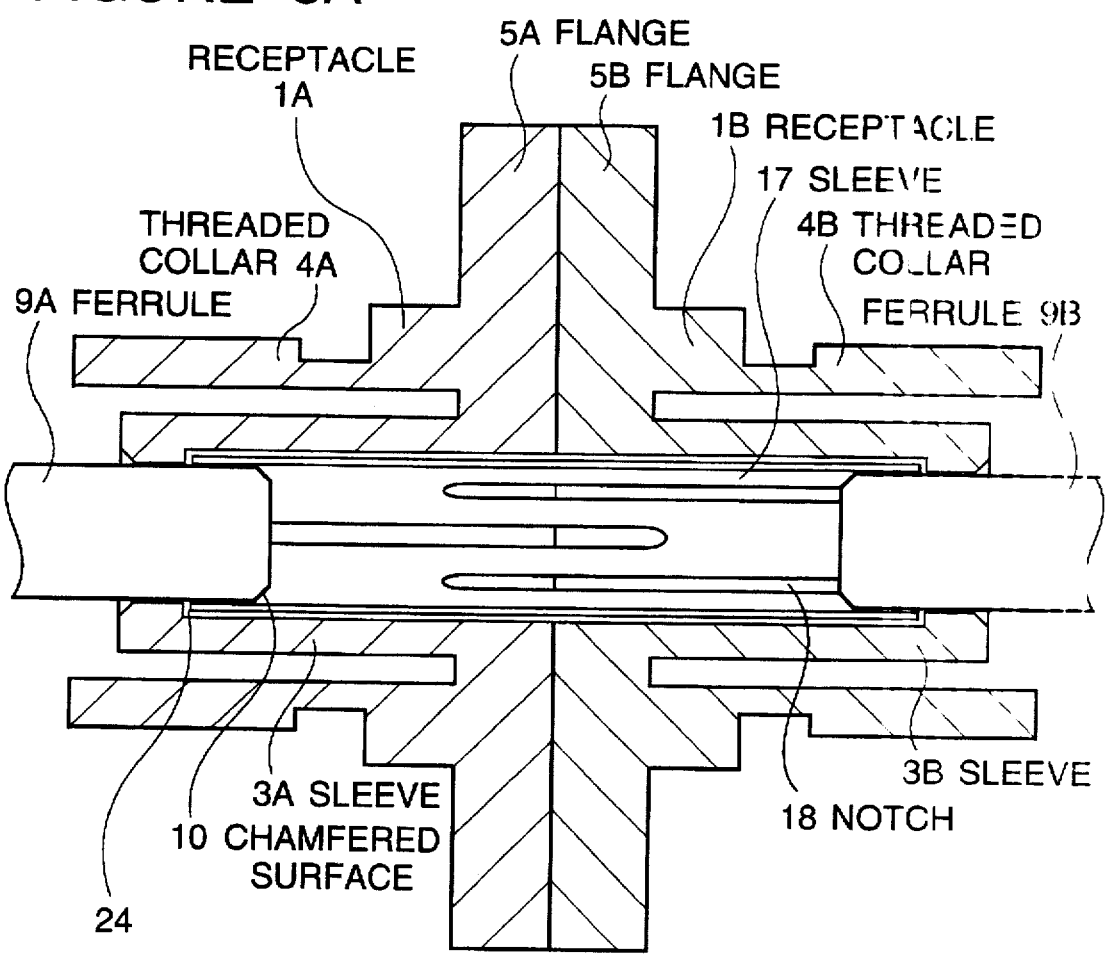
FIG. 8A is a diagrammatic sectional view of an embodiment of the light connector coupling apparatus in accordance with the present invention.
Figure 8B:
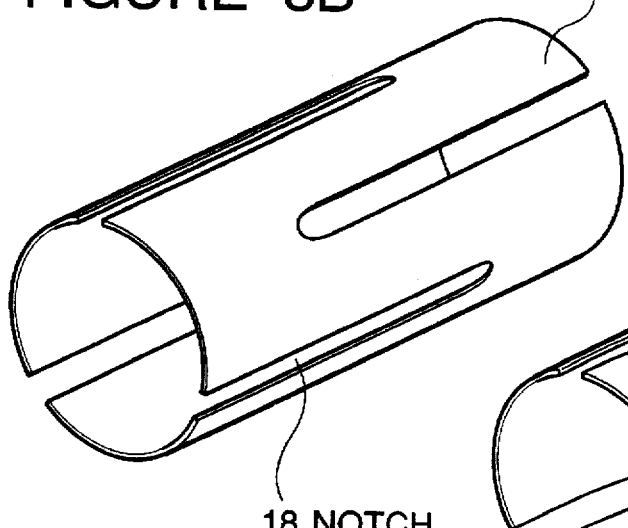
FIG. 8B is a diagrammatic perspective view of the inner sleeve of the light connector coupling apparatus shown in FIG. 8A.

Referring to FIGS. 8A, there is shown a diagrammatic sectional view of an embodiment of the light connector coupling apparatus in accordance with the present invention. FIG. 8B is a diagrammatic perspective view of the inner sleeve of the light connector coupling apparatus shown in FIG. 8A.

The shown light connector coupling apparatus is composed of a pair of receptacles 1A and 1B joined with each other, back to back. The pair of receptacles 1A and 1B have completely the same construction. Each of the receptacles 1A and 1B includes a flange 5A and 5B joined, back to back, to the flange of the other receptacle, a sleeve 3A or 3B integral with the flange and extending outwardly from the flange, a threaded collar 4A or 4B integral with the flange and coaxially surrounding the sleeve 3 and having an outer thread for being mated with a housing (not shown) of the light connector. One inner sleeve 17 is fined into the sleeves 3A and 3B when the flanges 5A and 5B are joined to each other, back to back, as shown in FIG. 8A.

In order to hold the inner sleeve 17 in the sleeves 3A and 3B, each of the sleeves 3A and 3B has an inner diameter slightly larger than an outer diameter of the inner sleeve 17 and and inner shoulder 24 which is formed at an outer end of an inner wall and which has a height slightly lower than thickness of the inner sleeve 17. When the flanges 5A and 5B are joined to each other, back to back, distance between the inner shoulder 24 of the respective sleeves 3A and 3B is slightly longer than the axial length of the inner sleeve 17.

Figure 8C:
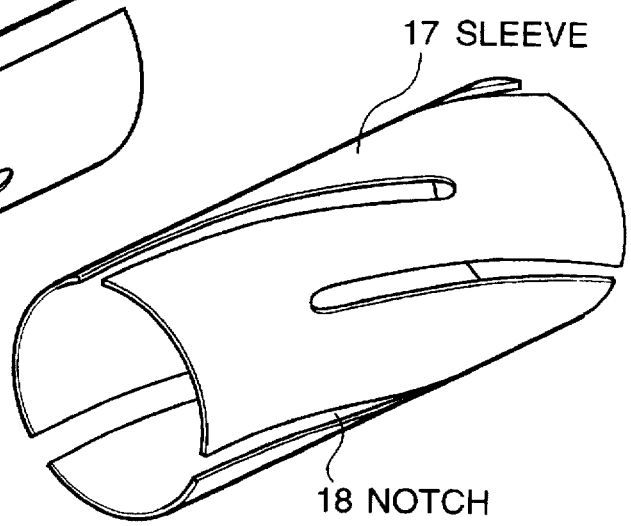
FIG. 8C is a diagrammatic perspective view of a modification of the inner sleeve shown in FIG. 8B.

As shown in FIG. 8B, the inner sleeve 18 has a plurality of notches 18 extending inwardly from each end of the inner sleeve 18 so as to sufficiently exceed a center position of the inner sleeve 18 but so as to terminate at a position sufficiently before the opposite end of the inner sleeve 18. The notches 18 extending from one end of the inner sleeve 17 are interdigitated with the notches 18 extending from the other end of the inner sleeve 17. The notches 18 linearly extending in parallel to the ferrule insertion direction. However, as shown in FIG. 8C, the notches 18 can be slightly spiral shaped so as to have a crossing angle of not greater than 45 degrees relative to the ferrule insertion direction, similar to the third embodiment.

The notches 18 have a function of expelling the foreign matter adhering to the ferrule 9, and/or dust between the ferrule 9 and the inner sleeve 17, from a contact surface between the ferrule 9 and the inner sleeve 17.

With this arrangement, it is possible to provide a light connector coupling apparatus which can make the connection loss not greater than 0.1 dB, and which can give a high reproducibility having repetition connection precision variation of not greater than 3%.

As seen from the above, the receptacle-type module in accordance with the present invention is characterized in that the sleeve for receiving and holding the ferrule of the light connector has one or more grooves which are formed on an inner wall surface of the sleeve and which are parallel to the ferrule insertion direction or which are spiral-shaped so as to have a crossing angle of not greater than a predetermined angle (for example, 45 degrees) relative to the ferrule insertion direction. With these features, it is possible to prevent accumulation of foreign matter or dust, with the result that variation amount of the optical characteristics is reduced to not greater than 3%. Thus, it is possible to provide a receptacle-type module having high reproducibility and high reliability.

The light connector coupling apparatus in accordance with the present invention is characterized in that the sleeve for receiving and holding the ferrule of the light connector has a plurality of notches which are parallel to the ferrule insertion direction or which are spiral-shaped so as to have a crossing angle of not greater than 45 degrees relative to the ferrule insertion direction. With this feature, it is possible to make connection loss not greater than 0.1 dB, and to realize repetition connection precision variation of not greater than 3%.

The invention has thus been shown and described with reference to the specific embodiments. However, it should be noted that the present invention is in no way limited to the details of the illustrated structures but changes and modifications may be made within the scope of the appended claims.

I claim:

1. A receptacle for being connected to a light connector, the receptacle comprising a sleeve for receiving and holding a ferrule of the light connector and an optical reference plane provided at a bottom position of said sleeve and for abutting against a tip end of said ferrule when said ferrule is completely inserted into said sleeve, said sleeve comprising a plurality of grooves formed on an inner wall surface of said sleeve and extending from a ferrule insertion end of said sleeve towards said optical reference plane, wherein said grooves are parallel to a ferrule insertion direction into said sleeve, said grooves extend to an end of said sleeve continuous with said optical reference plane, and said optical reference plane has grooves formed thereon in communication with said grooves formed on the inner wall surface of said sleeve.

2. A receptacle as claimed in claim 1, wherein each of said grooves has a width and depth which are about 30% to 40% of the cut length of a chamfered surface of said tip end of said ferrule.

3. A receptacle for being connected to connector, the receptacle comprising a sleeve for receiving and holding a ferrule of the light connector and an optical reference plane provided at a bottom position of said sleeve and for abutting against a tip end of said ferrule when said ferrule is completely inserted into said sleeve, said sleeve comprising a plurality of grooves formed on an inner wall surface of said sleeve and extending from a ferrule insertion end of said sleeve towards said optical reference plane, wherein said grooves are spiral-shaped and have a crossing angle of not greater than a predetermined angle relative to a ferrule insertion direction into said sleeve.

4. A receptacle as claimed in claim 3, wherein said grooves extend to an end of said sleeve continuous with said optical reference plane, and said optical reference plane has grooves formed thereon in communication with said grooves formed on the inner wall surface of said sleeve.

5. A receptacle as claimed in claim 4, wherein each of said grooves has a width and depth which are about 30% to 40% of the cut length of a chamfered surface of said tip end of said ferrule.

6. A receptacle as claimed in claim 3, wherein said predetermined angle is 45 degrees.

7. A receptacle for being connected to a light connector, the receptacle comprising a sleeve for receiving and holding a ferrule of the light connector and an optical reference plane provided at a bottom position of said sleeve and for abutting against a tip end of said ferrule when said ferrule is completely inserted into said sleeve, said sleeve comprising at least one groove formed on an inner wall surface of said sleeve and extending from a ferrule insertion end of said sleeve towards said optical reference plane, an angle being formed between said a least one groove and a ferrule insertion direction into said sleeve, said angle being not greater than 45 degrees, said optical reference plane having at least one groove formed thereon.

8. A receptacle as claimed in claim 7, wherein at least one groove has a width and depth which are about 30% to 40% of the cut length of a chamfered surface of said tip end of said ferrule.

9. A receptacle as claimed in claim 8, wherein a plurality of grooves are formed on the inner wall surface of said sleeve, number of said plurality of grooves is "n" wherein "n" is a positive integer, and each of said plurality of grooves rotates by 1/n of one rotation between said ferrule insertion end of said sleeve and said optical reference plane.

10. A receptacle as claimed in claim 9, wherein each of said grooves has a width and depth which are about 30% to 40% of the cut length of a chamfered surface of said tip end of said ferrule.

11. A receptacle as claimed in claim 10, wherein said grooves formed on the inner wall surface of said sleeve extend to an end of said sleeve continuous with said optical reference plane, and said optical reference plane has at least one groove formed thereon in communication with said grooves formed on the inner wall surface of said sleeve.

12. A receptacle as claimed in claim 8, wherein said at least one groove extends to an end of said sleeve continuous with said optical reference plane, and said optical reference plane has at least one groove formed thereon in communication with said at least one groove formed on the inner wall surface of said sleeve.

13. A receptacle as claimed in claim 12, wherein said angle is zero so that said at least one groove formed on the inner wall surface of said sleeve is parallel to said ferrule insertion direction.

14. A light connector coupling apparatus for aligning respective optical axes of respective ferrules of two light connectors with each other, said apparatus comprising a sleeve for receiving the respective ferrule of each of said two light connectors from opposite ends of said sleeve so that respective tip ends of said respective ferrules are abutted against each other within said sleeve, said sleeve having at least one respective notch extending substantially in each respective ferrule insertion direction into said sleeve from each of said opposite ends of said sleeve and exceeding a center position of said sleeve, and wherein each said respective notch is spiral-shaped and an angle is formed between each said respective notch and the respective ferrule insertion direction that is not greater than a predetermined angle.

15. A light connector coupling apparatus as claimed in claim 14, wherein said angle formed between each said respective notch and the respective ferrule insertion direction is not greater than 45 degrees.

\* \* \* \* \*

UNITED STATES PATENT AND TRADEMARK OFFICE
CERTIFICATE OF CORRECTION

PATENT NO. : 5,703,982
DATED : December 30, 1997
INVENTOR(S) : Teruo Takizawa

It is certified that error appears in the above-identified patent and that said Letters Patent is hereby corrected as shown below:

Claim 7, col. 9, line 16, "a" (first occurrence) should be --at--.

Signed and Sealed this

Twenty-fifth Day of August, 1998

Attest:

BRUCE LEHMAN

*Attesting Officer*  *Commissioner of Patents and Trademarks*